US012104550B1

(12) United States Patent
Bousquet et al.

(10) Patent No.: US 12,104,550 B1

(45) Date of Patent: Oct. 1, 2024

(54) ROTARY ENGINE WITH SIDE HOUSING HAVING A SIDE PLATE WITH A CERAMIC MATRIX COMPOSITE CORE

(71) Applicant: Pratt & Whitney Canada Corp., Longueuil (CA)

(72) Inventors: Michel Bousquet, Longueuil (CA); Johnny Vinski, Chateauguay (CA); Larry Lebel, Vercheres (CA); Christopher Gover, Longueuil (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 18/416,470

(22) Filed: Jan. 18, 2024

(51) Int. Cl.
*F02F 11/00* (2006.01)
*F02B 55/14* (2006.01)
*F02B 53/00* (2006.01)

(52) U.S. Cl.
CPC ............ *F02F 11/005* (2013.01); *F02B 55/14* (2013.01); *F02B 2053/005* (2013.01); *F05C 2203/08* (2013.01); *F05C 2253/04* (2013.01); *F05C 2253/16* (2013.01)

(58) Field of Classification Search
CPC ... F02F 11/005; F02B 55/14; F02B 2053/005; F05C 2203/08; F05C 2253/04; F05C 2253/16; F01C 19/10; F01C 1/22; F01C 21/06; F01C 21/108
See application file for complete search history.

(56) References Cited

U.S. PATENT DOCUMENTS

| | | | | | |
|---|---|---|---|---|---|
| 6,062,188 | A * | 5/2000 | Okamura | F02B 53/00 | 123/228 |
| 11,613,995 | B2 | 3/2023 | Gagnon-Martin | | |
| 11,761,376 | B1 * | 9/2023 | Vinski | F01C 21/06 | 123/200 |
| 2014/0230776 | A1 * | 8/2014 | Balendra | C04B 35/486 | 123/200 |
| 2016/0160324 | A1 * | 6/2016 | Okun | C22C 21/00 | 428/558 |

* cited by examiner

*Primary Examiner* — Grant Moubry
(74) *Attorney, Agent, or Firm* — Getz Balich LLC

(57) ABSTRACT

A rotary internal combustion engine is provided that includes a housing and a rotor. The housing includes first and second side housings and a center housing. The center housing is disposed between and attached to the first and second side housings. The rotor is disposed within a rotor chamber and is engaged with a rotor shaft that extends between the first and second side housings. The rotor has a peripheral side wall that extends between a pair of end face surfaces. At least one of the first side housing or the second side housing includes a side plate having a seal surface, an interior surface, and a core disposed between the seal surface and the interior surface. The core comprises a ceramic matrix composite (CMC) material. The seal surface of the side plate engages in a sealing arrangement with a respective rotor end face surface.

20 Claims, 7 Drawing Sheets

ROTARY ENGINE WITH SIDE HOUSING HAVING A SIDE PLATE WITH A CERAMIC MATRIX COMPOSITE CORE

BACKGROUND OF THE INVENTION

1. Technical Field

The present disclosure relates rotary engines in general and to rotary engine rotors in particular.

2. Background Information

Combustion chambers of a rotary engine, such as a Wankel engine, are defined by a rotor and a housing. The housing includes a pair of side housings and a center housing that collectively define a rotor chamber that houses the rotor. Each side housing includes a side plate that provides a sealing surface for the rotor. The side plates are subject to high temperatures and pressure forces. What is needed is a rotary engine that includes side plates that can withstand the high temperature and pressure environment, and one that includes side plates that are an improvement over currently existing side plates.

SUMMARY

According to an aspect of the present disclosure, a rotary internal combustion engine is provided that includes a housing and a rotor. The housing includes first and second side housings and a center housing. The center housing is disposed between and attached to the first and second side housings. The first and second side housings and the center housing define a rotor chamber. The rotor is disposed within the rotor chamber and is engaged with a rotor shaft that extends between the first and second side housings. The rotor has a peripheral side wall that extends between a pair of end face surfaces. At least one of the first side housing or the second side housing includes a side plate having a seal surface, an interior surface, and a core disposed between the seal surface and the interior surface. The core comprises a ceramic matrix composite (CMC) material. The seal surface of the side plate engages in a sealing arrangement with a respective rotor end face surface.

In any of the aspects or embodiments described above and herein, the seal surface of the side plate may consist of a ceramic material layer.

In any of the aspects or embodiments described above and herein, the interior surface of the side plate may consist of a ceramic material layer.

In any of the aspects or embodiments described above and herein, the side plate may include an outer edge surface that extends between the seal surface and the interior surface and extends around a periphery of the side plate.

In any of the aspects or embodiments described above and herein, the outer edge surface of the side plate may consist of a ceramic material layer.

In any of the aspects or embodiments described above and herein, the CMC material may include ceramic fibers disposed in a ceramic material matrix.

In any of the aspects or embodiments described above and herein, the fibers disposed in the ceramic material matrix may be in a two-dimensional arrangement.

In any of the aspects or embodiments described above and herein, the fibers disposed in the ceramic material matrix may be in a woven layer configuration.

In any of the aspects or embodiments described above and herein, the fibers disposed in the ceramic material matrix may be disposed in a plurality of woven layers.

In any of the aspects or embodiments described above and herein, the fibers disposed in the ceramic material matrix may be in a three-dimensional arrangement.

According to an aspect of the present disclosure, a side housing for a rotary internal combustion engine is provided that includes a perimeter section, a center section, and a side plate. The side plate is configured to be engaged with both the perimeter section and the center section. The side plate has a seal surface, an interior surface, and a core disposed between the seal surface and the interior surface, wherein the core comprises a ceramic matrix composite (CMC) material.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
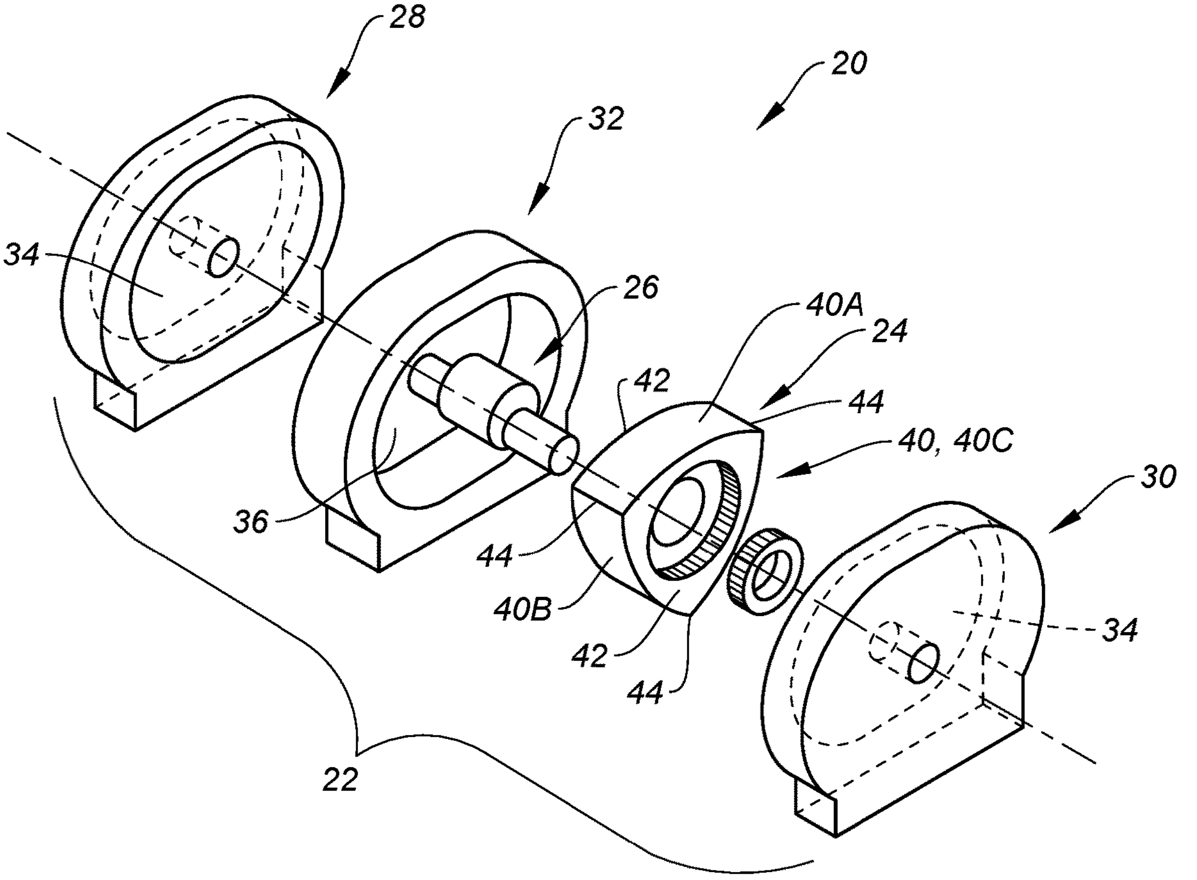
FIG. 1 diagrammatically illustrates a rotary engine in an exploded view.

FIG. 1 diagrammatically illustrates a Wankel-type rotary internal combustion engine 20 having a housing 22, a rotor 24, and a rotor shaft 26 in an exploded view. The housing 22 includes a first side housing 28, a second side housing 30, and center housing 32. Each side housing 28, 30 includes a side plate 34. The first side housing 28 connects to one axial end of the center housing 32, and the second side housing 30 connects to the opposite side of the center housing 32. The first and second side housings 28, 30 and the center housing 32 collectively form a rotor chamber 36 that houses the rotor 24. The rotor shaft 26 extends between the side housings 28, 30 and is engaged with the rotor 24 for rotational movement of the rotor 24.

Figure 2:
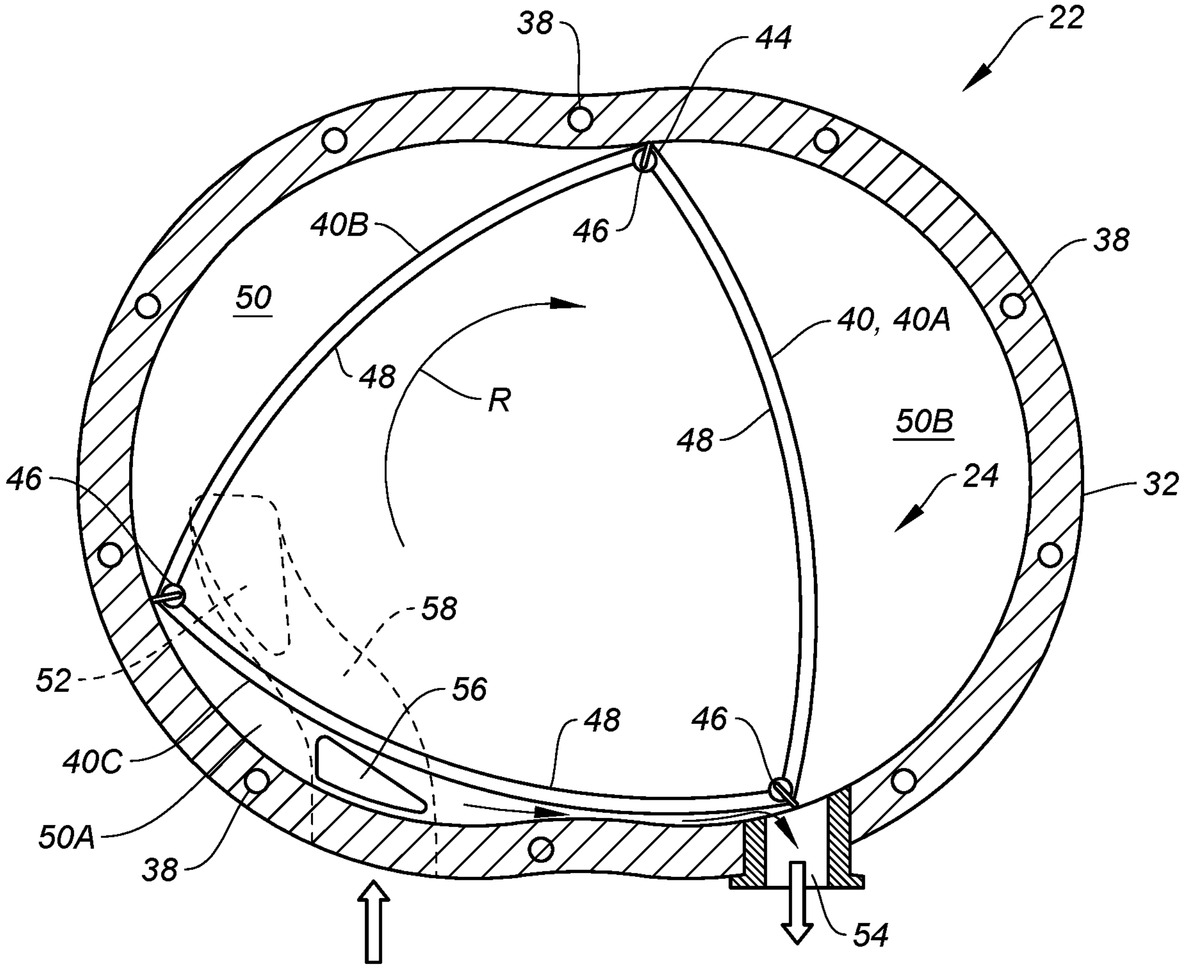
FIG. 2 is a diagrammatic planar view of a rotary engine.

FIG. 2 diagrammatically illustrates a rotor 24 disposed within the rotor chamber 36 surrounded by the center housing 32. The inner surfaces of the center housing 32 define the periphery of the rotor chamber 36 that has two lobes, which may be an epitrochoid. The housing 22 includes a coolant circuitry that passes through parts of the side housings 28, 30 and the center housing 32, aspects of which will be described herein. FIG. 2 diagrammatically illustrates coolant passages 38 disposed within the center housing 32; e.g., passages 38 that may extend between the side housings 28, 30. The coolant circuitry is used for circulating a coolant fluid to cool the housing 22 during operation of the engine 20. The present disclosure is not limited to any particular coolant circuitry.

Referring to FIGS. 1 and 2, the rotor 24 includes a peripheral side wall 40 that extends axially between two end face surfaces 42. The peripheral side wall 40 includes three circumferentially-spaced apex portions 44 and three side wall portions 40A-C, that collectively form a generally triangular profile. Each side wall portion 40A-C has an outwardly arching configuration. Each apex portion 44 includes an apex seal 46 that forms a seal engagement with inner surfaces of the center housing 32 that define the periphery of the rotor chamber 36. Each rotor end face surface 42 has at least one end face seal 48 extending between adjacent apex portions. Each end face seal 48 is disposed adjacent to but inwardly of a respective rotor peripheral side wall portion 40A-C. Each respective end face seal 48 is disposed in sealing engagement with a side plate 34 of a respective side housing 28, 30 as will be detailed herein. The geometrical axis of the rotor 24 is offset from and parallel to the axis of engine housing 22.

The engine 20 includes three rotating combustion chambers 50-50B disposed between the rotor 24 and housing 22. The combustion chambers 50-50B are sealed by the rotor apex seals 46 and the end face seals 48 detailed above. The described sealing arrangement is provided to illustrate an example of a sealing arrangement and the present disclosure is not limited thereto.

The rotor 24 is journaled on an eccentric portion of the rotor shaft 26 such that rotation of the rotor shaft 26 causes the rotor 24 to orbitally revolve within the rotor chamber 36. The rotor shaft 26 may rotate three times for each complete orbital rotation of the rotor 24 within the rotor chamber 36. Oil seals (not shown) are provided relative to the eccentric portion of the rotor shaft 26 to impede leakage flow of lubricating oil radially outwardly thereof between the respective rotor end face surface 42 and the respective side housing side plate 34. During each rotation of the rotor 24, each combustion chamber 50-50B varies in volumes and moves around the rotor chamber 36 to undergo the four phases of intake, compression, expansion and exhaust, these phases being similar to the strokes in a reciprocating-type internal combustion engine having a four-stroke cycle.

The engine 20 includes a primary inlet port 52 in communication with a source of air, an exhaust port 54, and an optional purge port 56 also in communication with the source of air (e.g., a compressor) and located between the inlet and exhaust ports 52, 54. The ports 52, 54, 56 may be defined in a side housing 28, 30 or in the center housing 32. In the embodiment diagrammatically shown in FIG. 2, the inlet port 52 and purge port 56 are disposed in the side housing 28, 30 and communicate with an intake duct 58 defined as a channel in the side housing 28, 30, and the exhaust port 54 is disposed in the center housing 32. The described port arrangement is provided to illustrate an example of a port arrangement and the present disclosure is not limited thereto.

During operation of the engine 20, an acceptable fuel (e.g., conventional aviation fuels such as AVGAS or kerosene, or sustainable aviation fuels (SAFs), or the like) is delivered into the respective combustion chambers 50-50B through a fuel port (not shown) such that a respective combustion chamber 50-50B is stratified with a fuel-air mixture near an ignition source and a leaner mixture elsewhere, and the fuel-air mixture may be ignited within the combustion chamber 50-50B using any suitable ignition system known in the art (e.g. spark plug, glow plug). In a particular embodiment, the rotary engine 20 operates under the principle of the Miller or Atkinson cycle, with its compression ratio lower than its expansion ratio, through appropriate relative location of the primary inlet port 52 and exhaust port 54.

Figure 3:
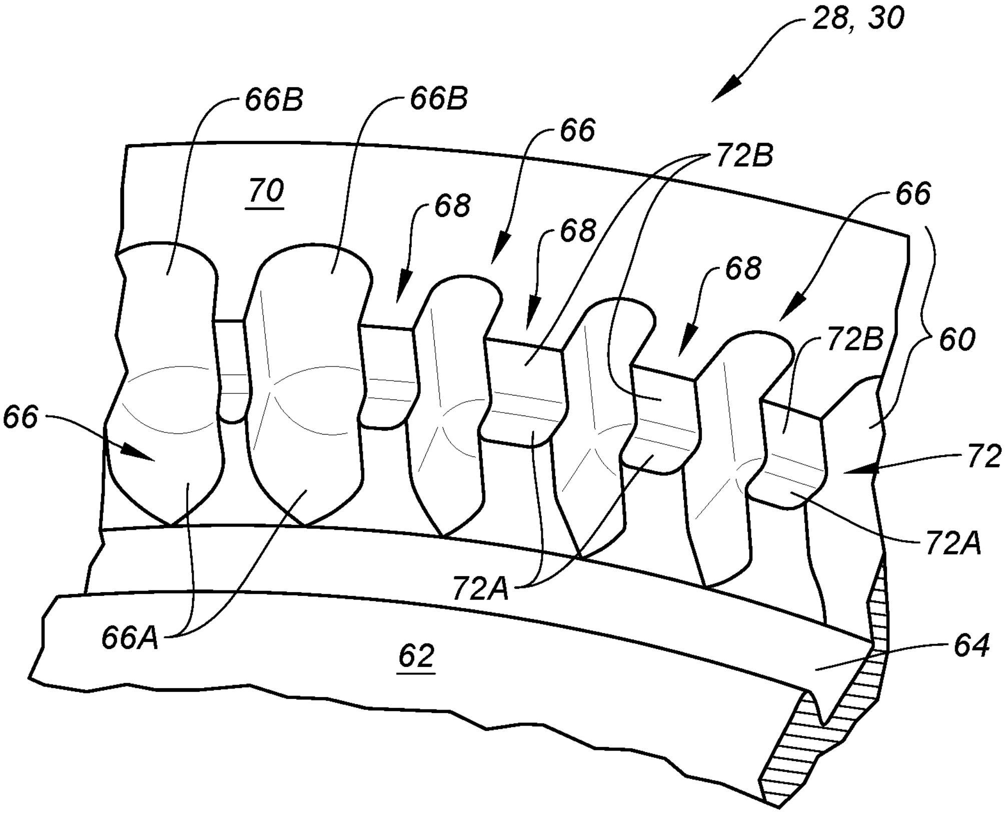
FIG. 3 is a diagrammatic partial perspective view of an side housing.

FIG. 3 is a diagrammatic partial perspective view of a side housing 28, 30. In this embodiment, the side housing 28, 30 includes a perimeter section 60 and a center section 62. The perimeter section 60 is disposed at, and extends around, the periphery of the side housing 28, 30. The perimeter section 60 is configured for engagement with the center housing 32 as will be detailed herein. In some embodiments, the side housing 28, 30 may include a coolant channel 64 disposed between the perimeter section 60 and the center section 62. The present disclosure side housings 28, 30 do not require a coolant channel 64 disposed between the perimeter section 60 and the center section 62. For example, in some embodiments the center section 62 may include one or more features (e.g., posts or the like—not shown) disposed within an open cavity. The features are configured to support the side plate 34 associated with the respective side housing 28, 30 and the side plate 34 encloses the open cavity. Coolant flow is permitted in the open cavity amongst the features. U.S. patent application Ser. No. 18/132,187, entitled "Rotary Engine Side Housing and Method for Producing the Same", filed Apr. 7, 2023, which application is commonly assigned with the present application, and which application is hereby incorporated by reference in its entirety, discloses side housing configurations that include features configured to support a side plate 34 associated with a respective side housing.

Figure 4:
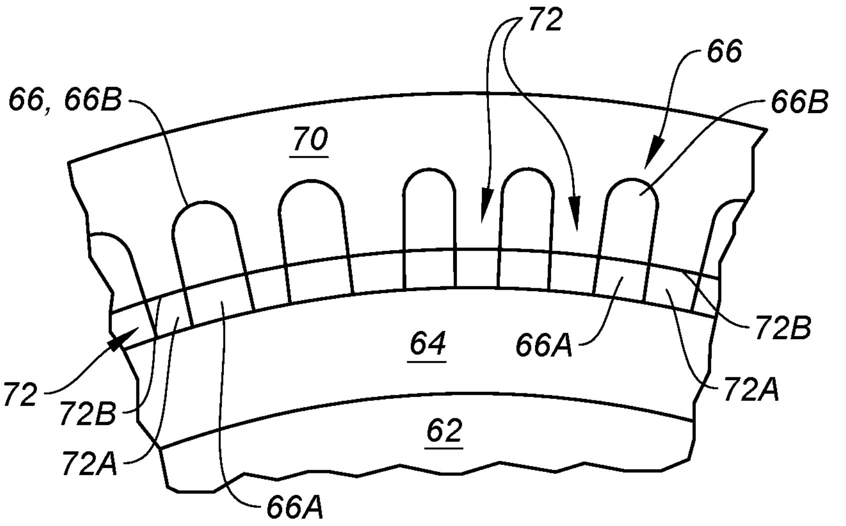
FIG. 4 is a diagrammatic partial planar view of a side housing.
Figure 4A:
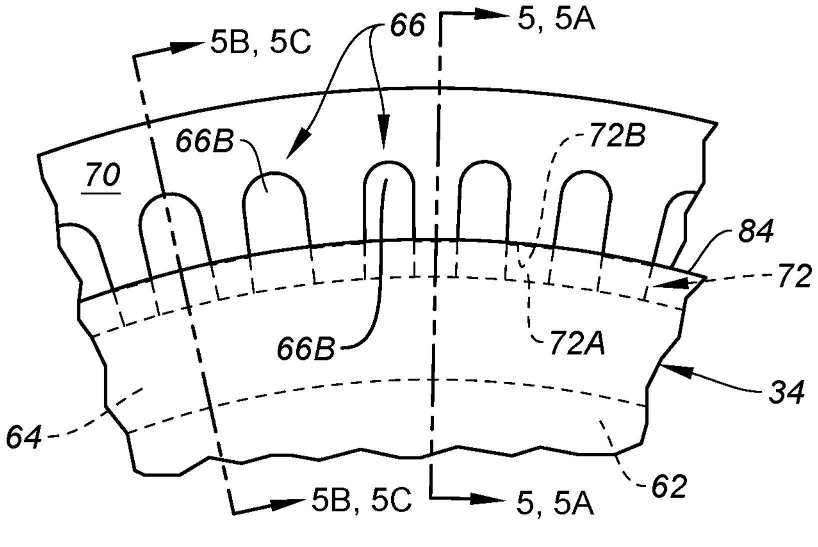
FIG. 4A is the diagrammatic partial planar view of a side housing shown in FIG. 4, now including a side plate.

In the embodiment shown in FIG. 3, the perimeter section 60 includes a plurality of coolant cavities 66, a plurality of pedestals 68, and a center housing (CH) engagement surface 70. The CH engagement surface 70 is configured for engagement with the center housing 32 when the engine housing 22 is assembled. Each pedestal 68 is disposed "circumferentially" between a pair of coolant cavities 66, or conversely each pedestal 68 has a coolant cavity 66 disposed on each circumferential side of the pedestal 68. As described above and shown in FIG. 2, the rotor chamber 36 has a profile that defines two lobes. The term "circumferentially" is used herein to describe the relative positions of the coolant cavities 66 and pedestals 68 disposed around the perimeter of the arcuate rotor chamber lobes. Each respective coolant cavity 66 includes a lower end 66A that is in fluid communication with the coolant channel 64 (or the open cavity) and an upper end 66B that is in fluid communication with the CH engagement surface 70. The upper ends 66B of the coolant cavities 66 may be configured to align with coolant passages 38 that extend through the center housing 32; e.g., see FIGS. 5B and 5C. The center housing coolant passages 38 may provide a fluid conduit to the opposite side housing 28, 30. Each pedestal 68 include a side plate seat 72 having a first seat surface 72A and a second seat surface 72B. In the embodiment shown in FIG. 3, the first seat surface 72A is spaced apart a distance (i.e., the "plate seat depth") from the CH engagement surface 70 and the second seat surface 72B extends between the first seat surface 72A and the CH engagement surface 70. As will be detailed herein, the side plate seats 72 are configured to receive a portion of the side plate 34. The plate seat depth may be approximately equal to the thickness of the portion of the side plate 34 engaged with the side plate seat 72. FIG. 4 is a diagrammatic partial planar view of a side housing 28, 30 that shows coolant cavities 66, pedestals 68, the coolant channel 64, and the center section 62. The first seat surface 72A and second seat surface 72B of the side plate seat 72 of each pedestal 68 are identified in FIG. 4. No side plate 34 is shown in FIG. 4. FIG. 4A is the same view as FIG. 4 but now including a side plate 34. The upper end 66B of each coolant cavity 66 that is in fluid communication with the CH engagement surface 70 is shown in FIG. 4A. The side plate 34 when engaged with the pedestal plate seats 72 obscures the lower end 66A of each coolant cavity 66, a portion of each pedestal 68, the coolant channel 64, and the center section 62 of the side housing 28, 30. To facilitate the description herein, FIG. 4A shows the obscured portions of the side housing 28, 30 (i.e., the lower end 66A of each coolant cavity 66, the portion of each pedestal 68, the coolant channel 64, and the center section 62) in dashed line. A side housing 28, 30 may be made from a variety of materials, including aluminum, aluminum alloys, and the like due to their light weight and high thermal conductivity. However, aluminum has high thermal coefficient of expansion and low Young's modulus, which may result in high deflections under respectively, high thermal and pressure loads.

Figure 5:
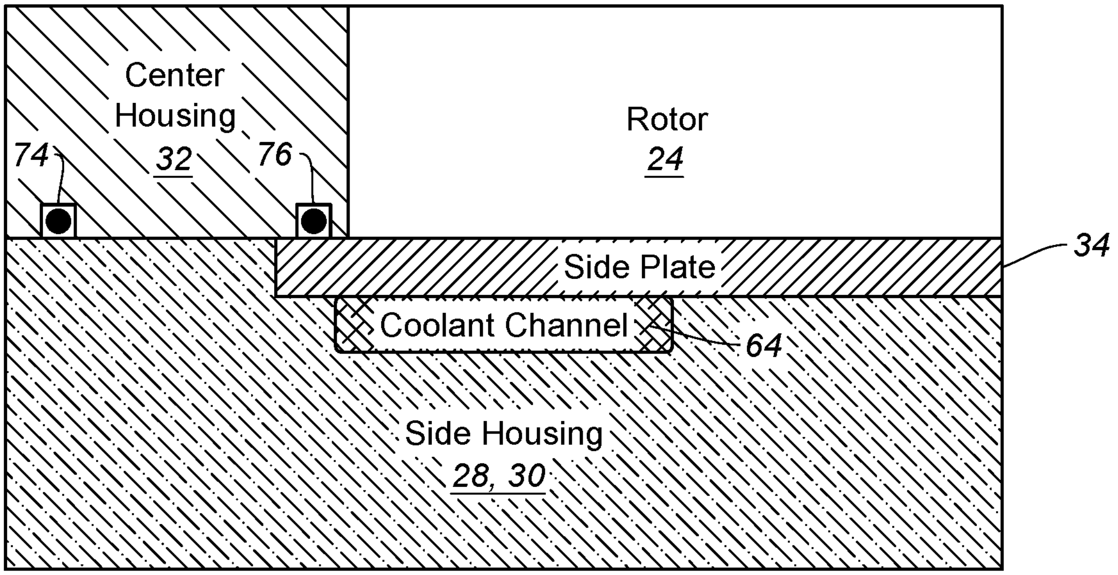
FIGS. 5-5C are diagrammatic sectioned partial views of a rotary engine embodiment. The sectional view shown in FIGS. 5 and 5A is along a section indicated by sectional line 5, 5A-5, 5A shown in FIG. 4A, except FIG. 4A omits the center housing. The sectional view shown in FIGS. 5B and 5C is along a section indicated by sectional line 5B, 5C—5B, 5C shown in FIG. 4A, except FIG. 4A omits the center housing.
Figure 5A:
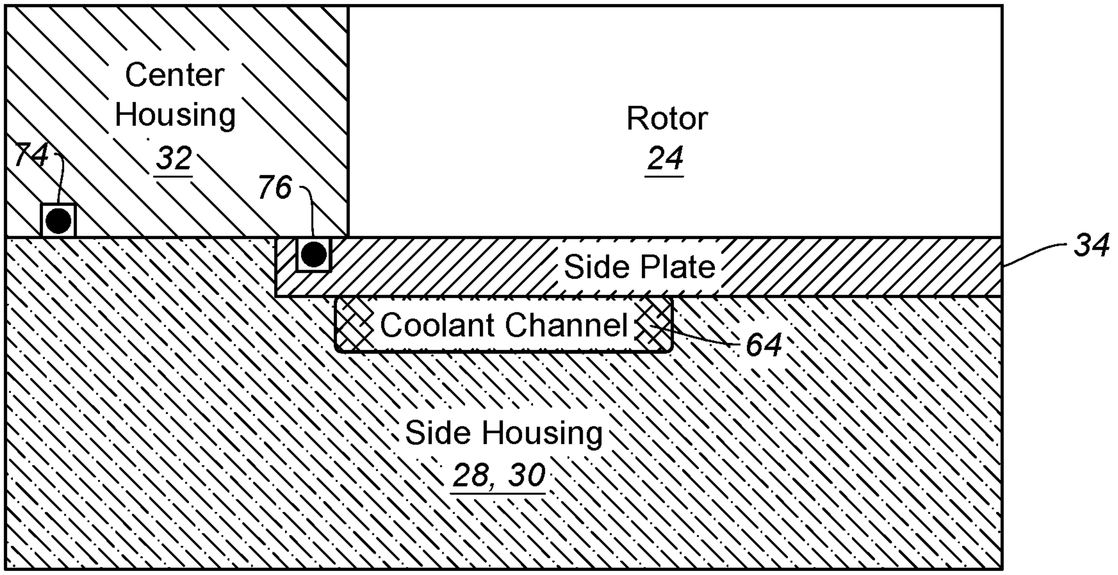
Figure 5B:
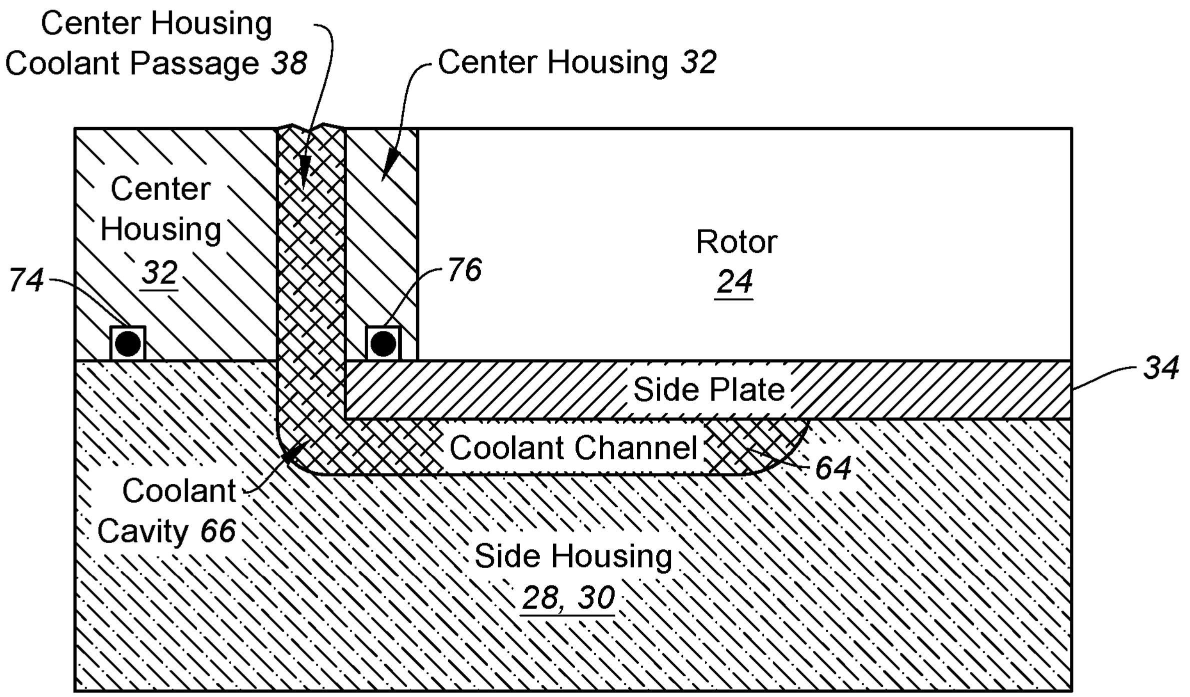
Figure 5C:
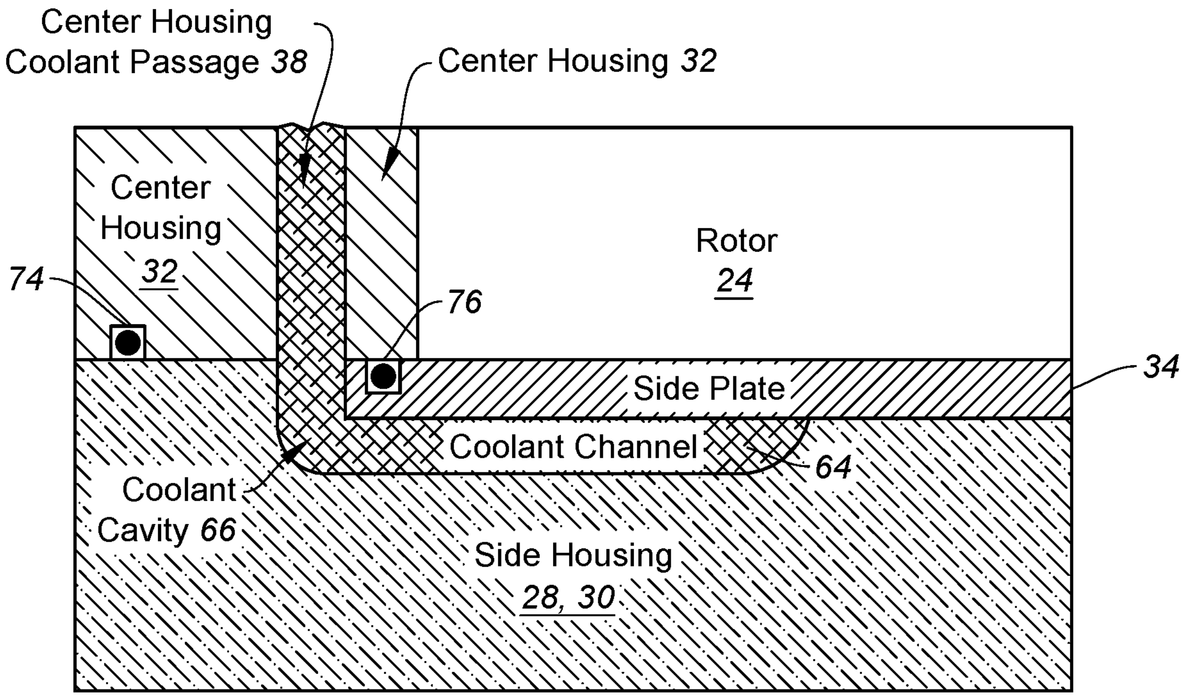

FIGS. 5-5C illustrate diagrammatic sectional views that show a side housing 28, 30, a center housing 32, a side plate 34, and a rotor 24 in assembled form. FIGS. 5 and 5A diagrammatically illustrate a sectional view along a section taken through a coolant cavity 66 like the sectional line 5, 5A-5, 5A shown in FIG. 4A (except FIG. 4A omits the center housing 32). FIGS. 5B and 5C diagrammatically illustrate a sectional view along a section taken through a pedestal 68 like the sectional line 5B, 5C—5B, 5C shown in FIG. 4A (except FIG. 4A omits the center housing 32). In FIGS. 5 and 5A, a portion of the side plate 34 (i.e., a portion of the side plate 34 at the outer edge surface 84 detailed herein) is disposed between a portion of the center housing 32 and a portion of the side housing 28, 30 (i.e., the pedestal 68). In FIG. 5, a pair of seals 74, 76 are disposed within the center housing 32 for engagement with the CH engagement surface 70 of the side housing 28, 30. In FIG. 5A, a first seal 74 is disposed within the center housing 32 for engagement with the CH engagement surface 70, and a second seal 76 is disposed in the side plate 34 for engagement with the center housing 32. FIGS. 5B and 5C also show the portion of the side plate 34 disposed between the center housing 32 and the side housing 28, 30. FIGS. 5B and 5C, however, illustrate a coolant cavity 66 disposed in the side housing 28, 30 and that coolant cavity 66 is aligned with a coolant passage 38 disposed in the center housing 32. The seal arrangement shown diagrammatically in FIGS. 5B and 5C is the same as that shown in FIGS. 5 and 5A. The present disclosure is not limited to any particular seal arrangement between the side housing 28, 30 and the center housing 32.

In some embodiments, the side plate 34 may be attached to the side housing 28, 30. In some embodiments, the side plate 34 may be in contact with the side housing 28, 30 but may be free to move a small amount relative to the side housing 28, 30; e.g., relative movement as a result of thermal expansion difference between the side plate 34 and the side housing 28, 30, or movement attributable to deflection, or the like. In the latter configuration, the side plate 34 may be described as "floating". The present disclosure is not limited to any particular arrangement for securing a side plate 34 relative to a side housing 28, 30.

Figure 6:
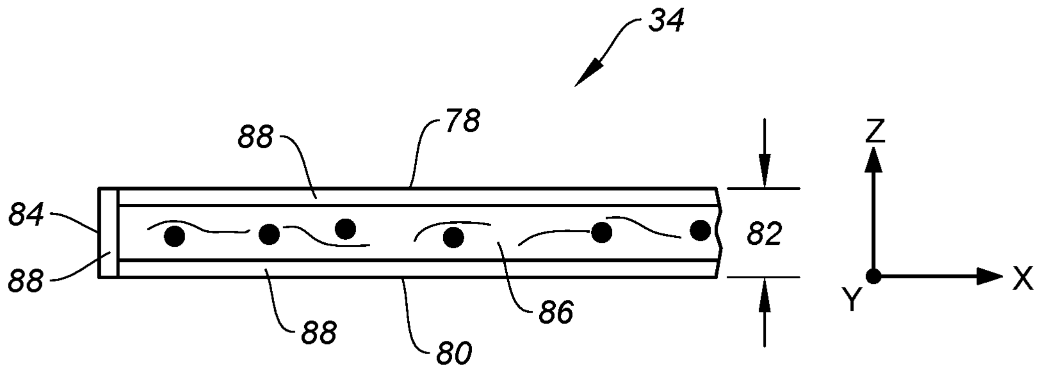
FIG. 6 is a diagrammatic partial side view of a side plate.
Figure 6A:
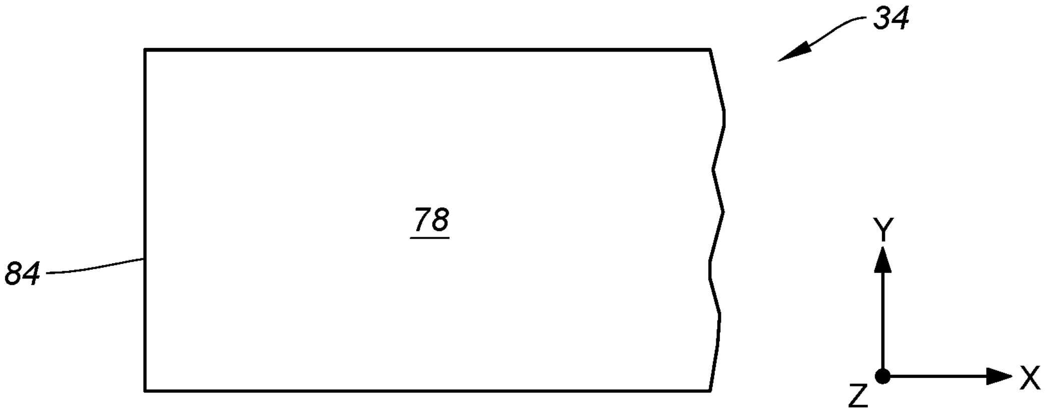
FIG. 6A is a diagrammatic partial top view of a side plate.

FIG. 6 illustrates a diagrammatic partial side view of a side plate 34 and FIG. 6A diagrammatically illustrates a partial top view of a side plate 34. The side plate 34 includes a seal surface 78 and an interior surface 80 opposite the seal surface 78. The distance between the seal surface 78 and the interior surface 80 may be referred to as the thickness 82 of the side plate 34. The side plate 34 has an outer edge surface 84 that extends between seal surface 78 and the interior surface 80. The outer edge surface 84 may extend around the entire outer perimeter of the side plate 34. The side plate 34 includes a center aperture (not shown) through which a portion of the rotor shaft 26 extends. The side plate 34 may be configured as a planar structure or a non-planar structure. A non-planar side plate 34 may, for example, include heat transfer features and/or support features, or the like (not shown), extending outwardly from the interior surface 80. The present disclosure is not limited to any particular side plate 34 geometric configuration. U.S. patent application Ser. No. 18/132,187, entitled "Rotary Engine Side Housing and Method for Producing the Same", which is commonly assigned with the present application, and which is hereby incorporated by reference in its entirety, discloses posts disposed between the side housing 28, 30 and the side plate 34 extending within a coolant chamber. Each side plate 34 defines a surface of the rotor chamber 36. As described above, the rotor 24 includes end face seals 48 (e.g., see FIG. 2) that provide a seal between each respective rotor end face surface 42 and the respective side housing side plate 34. Hence, the side plate 34 acts as a seal surface 78 for the rotor end face seals 48.

The present disclosure reflects a discovery by the inventors regarding a significantly improved side plate 34 configuration. Side plates comprising an aluminum material (e.g., various aluminum types, or aluminum alloy types, or the like) are known. Aluminum/Al alloys side plates are typically light weight and typically provide high thermal conductivity. However, aluminum/Al alloys side plates also typically have poor wear-resistance properties. In addition, aluminum/Al alloys typically have a high thermal coefficient of expansion and a low Young's modulus, which may result in undesirable deflection in a high temperature and pressure load environment.

U.S. Pat. No. 11,613,995, entitled "Rotary Engine with Housing having Silicon Carbide Plate", which is hereby incorporated by reference in its entirety, discloses a side plate that comprises silicon carbide; e.g., the portion of the side plate that is in sealing engagement with the rotor end face seals is made of a ceramic material such as silicon carbide or aluminum nitride. The ceramic material possesses high thermal conductivity combined with low density, and also possesses a high degree of hardness that resists frictional wear. A side plate according to the '995 patent is understood to be a substantial improvement over known aluminum/Al alloy side plate configurations.

Aspects of the present disclosure are directed to a further significant side plate 34 improvement. Embodiments of the present disclosure include a side plate 34 comprising a ceramic matrix composite (CMC) core 86 with a ceramic material layer 88 disposed at only the seal surface 78 in some side plate 34 embodiments, and at both the seal surface 78 and the interior surface 80 at other side plate 34 embodiments; e.g., as shown in FIG. 6. In some embodiments, a present disclosure side plate 34 may also include a ceramic material layer 88 disposed on the outer edge surface 84 that extends between seal surface 78 and the interior surface 80.

The CMC core 86 includes reinforcing ceramic fibers disposed in a ceramic material matrix. A variety of different fiber configurations may be used within the CMC core 86; e.g., short length fibers, or long length fibers, or any combination thereof. The fibers may be disposed in a two dimensional arrangement or in a three dimensional arrangement. A nonlimiting example of a two dimensional arrangement is a woven fiber layer. To illustrate, a side plate 34 orientation may be described as the side plate 34 extending in an X-Y axis plane and having a Z-axis thickness; e.g., see FIGS. 6 and 6A. The woven fiber layer may be disposed within a ceramic material matrix and extend in an X-Y plane. In some embodiments, a CMC core 86 may include a plurality of woven fiber layers. An example of a three dimensional arrangement is a fiber weave or arrangement that includes fibers extending in all three directions X, Y, and Z (and variations thereof), disposed within a ceramic material matrix. The fibers within the fiber weave or arrangement may be directionally organized or randomly directionally disposed.

The CMC core 86 may include one type of ceramic fiber material, or more than one type of ceramic fiber material. Non-limiting examples of ceramic fiber materials include silicon carbide (SiC), silicon oxycarbide (SiOC), alumina ($Al_2O_3$), and the like. The present disclosure is not limited to any particular ceramic fiber material. The CMC core matrix 86 may also comprise ceramic materials like SiC, SiOC, $Al_2O_3$, and the like. The present disclosure is not limited to any particular ceramic matrix material.

The ceramic material layer 88 disposed at the seal surface 78 or at both the seal surface 78 and the interior surface 80 (and/or on the outer edge surface 84) may comprise ceramic materials like SiC, SiOC, $Al_2O_3$, and the like. The present disclosure is not limited to any particular ceramic material layer material.

The CMC core 86 is understood to have improved resistance to crack propagation characteristics relative to a monolithic ceramic material; e.g., crack propagation is understood to be mitigated by the fibers within the CMC core 86 and fracture resistance is understood to be improved. Hence, the ceramic fiber reinforcements not only increase the CMC core's initial resistance to crack propagation but also the ceramic fiber reinforcements allow the CMC core 86 to avoid abrupt brittle failure that is often characteristic of monolithic ceramics.

The ceramic material layer 88 disposed at the seal surface 78 or at both the seal surface 78 and the interior surface 80 (and/or on the outer edge surface 84) does not include ceramic fiber reinforcement. The thickness of the ceramic material layer 88 on the seal surface 78 is chosen to be thick enough to withstand normal wear resulting from contact with the rotor seals (e.g., the end face seals 48) during operation of the engine 20 for the expected life of the rotor 24. In some applications, the thickness of the ceramic material layer 88 on the seal surface 78 may be in the range of 0.005-0.020 inches. The thickness of the ceramic material layer 88 on the interior surface 80 is chosen to be thick enough to withstand normal wear resulting from contact with the pedestal seat surfaces 72A, 72B and the side housing center section 62 (including features when present) that may occur during engine 20 operation. The thickness of the ceramic material layer 88 on the outer edge surface 84 is chosen to be thick enough to withstand normal wear resulting from contact with the pedestal surfaces 72A, 72B that may occur during engine 20 operation. The portion of the ceramic material layer seal surface 78 that is engaged with the rotor seals may be configured with a surface finish that improves sealing and seal durability.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A rotary internal combustion engine, comprising:

a housing having a first side housing, a second side housing, and a center housing, wherein the center housing is disposed between and attached to the first side housing and the second side housing, and first side housing, the second side housing, and the center housing define a rotor chamber; and a rotor disposed within the rotor chamber, wherein the rotor is engaged with a rotor shaft that extends between the first side housing and the second side housing, and the rotor has a peripheral side wall that extends between a pair of end face surfaces;

wherein at least one of the first side housing or the second side housing includes a side plate having a seal surface, an interior surface, and a core disposed between the seal surface and the interior surface, wherein the core comprises a ceramic matrix composite (CMC) material; and wherein the seal surface of the side plate engages in a sealing arrangement with a respective end face surface of the rotor.

2. The rotary internal combustion engine of claim 1, wherein the seal surface of the side plate consists of a ceramic material layer.

3. The rotary internal combustion engine of claim 1, wherein the interior surface of the side plate consists of a ceramic material layer.

4. The rotary internal combustion engine of claim 1, wherein the side plate further comprises an outer edge surface that extends between the seal surface and the interior surface and extends around a periphery of the side plate.

5. The rotary internal combustion engine of claim 4, wherein the outer edge surface of the side plate consists of a ceramic material layer.

6. The rotary internal combustion engine of claim 1, wherein the CMC material includes ceramic fibers disposed in a ceramic material matrix.

7. The rotary internal combustion engine of claim 6, wherein the fibers disposed in the ceramic material matrix are in a two-dimensional arrangement.

8. The rotary internal combustion engine of claim 6, wherein the fibers disposed in the ceramic material matrix are in a woven layer configuration.

9. The rotary internal combustion engine of claim 6, wherein the fibers disposed in the ceramic material matrix are disposed in a plurality of woven layers.

10. The rotary internal combustion engine of claim 6, wherein the fibers disposed in the ceramic material matrix are in a three-dimensional arrangement.

11. A side housing for a rotary internal combustion engine, comprising:

a perimeter section;

a center section; and a side plate configured to be engaged with both the perimeter section and the center section, the side plate has a seal surface, an interior surface, and a core disposed between the seal surface and the interior surface, wherein the core comprises a ceramic matrix composite (CMC) material.

12. The side housing of claim 11, wherein the seal surface of the side plate consists of a ceramic material layer.

13. The side housing of claim 11, wherein the interior surface of the side plate consists of a ceramic material layer.

14. The side housing of claim 11, wherein the side plate further comprises an outer edge surface that extends between the seal surface and the interior surface and extends around a periphery of the side plate.

15. The side housing of claim 14, wherein the outer edge surface of the side plate consists of a ceramic material layer.

16. The side housing of claim 11, wherein the CMC material includes ceramic fibers disposed in a ceramic material matrix.

17. The side housing of claim 16, wherein the fibers disposed in the ceramic material matrix are in a two-dimensional arrangement.

18. The side housing of claim 16, wherein the fibers disposed in the ceramic material matrix are in a woven layer configuration.

19. The side housing of claim 16, wherein the fibers disposed in the ceramic material matrix are disposed in a plurality of woven layers.

20. The side housing of claim 16, wherein the fibers disposed in the ceramic material matrix are in a three-dimensional arrangement.

* * * * *